US012797283B2

(12) United States Patent
Huang et al.

(10) Patent No.: US 12,797,283 B2
(45) Date of Patent: Nov. 17, 2026

(54) DEVICE AND METHOD FOR AIDING PERSONS TO WALK ON UNEVEN SURFACES

(71) Applicants: Rebekah Huang, Belmont, MA (US); Katherine Cho, Belmont, MA (US); Ruth Gao, Arlington, MA (US); Mary Liu, Belmont, MA (US)

(72) Inventors: Rebekah Huang, Belmont, MA (US); Katherine Cho, Belmont, MA (US); Ruth Gao, Arlington, MA (US); Mary Liu, Belmont, MA (US)

( * ) Notice: Subject to any disclaimer, the term of this patent is extended or adjusted under 35 U.S.C. 154(b) by 307 days.

(21) Appl. No.: 18/612,181

(22) Filed: Mar. 21, 2024

(65) Prior Publication Data

US 2025/0295547 A1 Sep. 25, 2025

(51) Int. Cl.
*A61H 3/00* (2006.01)

(52) U.S. Cl.
CPC ......... *A61H 3/00* (2013.01); *A61H 2003/001* (2013.01)

(58) Field of Classification Search
CPC ............................ A61H 3/00; A61H 2003/001
See application file for complete search history.

(56) References Cited

U.S. PATENT DOCUMENTS

| | | | | |
|---|---|---|---|---|
| 5,499,645 | A | 3/1996 | Baliga | |
| 2020/0397641 | A1* | 12/2020 | Teng | A61H 1/024 |
| 2021/0069052 | A1* | 3/2021 | Burke | A61H 3/00 |
| 2021/0353495 | A1* | 11/2021 | Shen | E04F 11/1863 |
| 2025/0248877 | A1* | 8/2025 | Anderson | A61H 3/00 |
| 2026/0000566 | A1* | 1/2026 | Hall | A61H 3/008 |

FOREIGN PATENT DOCUMENTS

| | | | |
|---|---|---|---|
| EP | 1467043 | A1 | 10/2004 |
| JP | H10-115062 | A | 5/1998 |

OTHER PUBLICATIONS

Non-Slip Pre-Cut Stair Treads, Slip Doctors, https://slipdoctors.com/colletioins/non-slip-stair-treds-coatings/product/black-antislip-stair-safety-treads, 2017 (6 pages).
VIDEO: "2023 Raytheon Technologies Invention Convention U.S. Nationals Awards Ceremony", YouTube, https://www.youtube.com/watch?v=1b1H9W5nMBs, Livestreamed Jun. 9, 2023 (1 page).
WEBSITE: Stair Steady, https://stairsteady.net, 2024 (13 pages).
WEBSITE: The Bean Stalk, https://ivybean.shop, 2024 (8 pages).

* cited by examiner

*Primary Examiner* — Mark A Williams
(74) *Attorney, Agent, or Firm* — Wilmer Cutler Pickering Hale and Dorr LLP

(57) ABSTRACT

A device and method for aiding persons to walk in uneven surfaces. The device including a first hook member that can form a handle to engage with the person being assisted and a second hook member that can be used to provide a secure handle to a stationary wall element such as a guardrail and allow sliding movement. The two hook members are coupled together through a brace and adjustable plate, which are coupled on a pivot point to permit for the brace to pivot and rotate around the point. The rotation allows the second hook member to engage the guardrail in either a first or second position. The first position allows for sliding movement of the hook member, while the second position causes the second hook member to form a releasable clamp with the guardrail and arrest the movement of the second hook member along the guardrail.

14 Claims, 5 Drawing Sheets

DEVICE AND METHOD FOR AIDING PERSONS TO WALK ON UNEVEN SURFACES

BACKGROUND OF THE INVENTION

Field of the Invention

The present invention relates to an assistance device and method for aiding people to walk in uneven surfaces including climb and descend stairs.

Description of Related Art

The ability of person to move about independently and safely given their surroundings is an important element to mobility. Impaired individuals require assistance to navigate areas which include uneven surfaces with a major challenge being considered the ability to safely ascend and descend staircases. Typically, staircases include stationary elements to provide some assistance for individuals using them. Specifically, such stationary elements include guardrails, railing, banisters and other structural elements that are disposed either on one or both sides of the staircase and which individuals can engage with their hands to provide support and balance during their movement. Nonetheless, such structural elements do not suffice in aiding and arresting potential falls of individuals that may be challenged in terms of their mobility.

Moreover, the use of convention walking aids and other devices such as canes, walkers, handles etc. are not necessarily applicable for use on uneven surfaces, such as stairs, because they require either the use of one hand or are not appropriately manageable in order to ensure proper placement along the uneven surface (e.g., angle, height). Further, they rely on the fact that the person using them can have adequate strength to manipulate the aid. Indeed, such aids can pose additional challenges and may actually introduce more harm than their intended use if the persons using them are minors or elderly populations whose mobility may not be fully developed or may be compromised.

Importantly, existing walking aids, even those that are added on guardrails and banisters of stairs, are not able to arrest the fall or movement of a person due to their potential mobility impairments. This becomes especially important when the person is, for example, descending a set of stairs since the risk of severe injury increases (e.g., fractures, concussions). As such, the use of mobility assistive devices that can be portable and arrest the movement and fall of a person when walking in uneven surfaces such as staircases is highly desirable.

SUMMARY

In some embodiments of the instant application an assistive device for arresting the fall of a person using a guardrail is provided, the device comprising a first grabbing member comprising at least one hook forming a handle, a second grabbing member comprising at least one hook capable of engaging with the guardrail, an adjustable plate coupled to the first and second grabbing members; and a brace coupled to the adjustable plate at a pivot point and configured to rotate around the pivot point such that the brace and the second grabbing member are capable of forming a releasable clamp for engaging with the guardrail, wherein the rotation of the brace around the pivot point causes the second grabbing member to selectively engage with the guardrail in either: a first position in which the releasable clamp is released from the guardrail to permit a sliding motion of the second grabbing member along the guardrail or a second position in which the releasable clamp is clamped onto the guardrail such that movement of the second grabbing member along the guardrail is arrested.

In some embodiments the assistive device's grabbing members each comprise identical hook members including, but not limited to double J hooks. In some embodiments, the assistive device's adjustable plate is capable of being adjustable in a vertical direction to accommodate for different guardrail, banister sizes.

In some embodiments, the assistive device's grabbing members are partially covered with a soft material to provide smooth engagement and movement along the guardrail while also protecting the surrounding structural elements being used by the device. In some embodiments, such materials can include, but are not limited to felt.

Further, in some embodiments, the grabbing members are coupled to the adjustable plate and are arranged in anti-symmetric and facing opposite directions whereby one grabbing member is accessible to the person in the form of a handle, while the other grabbing member is placed as a hook onto the structural element (e.g., guardrail).

In some embodiments, the assistive device's brace is a corner brace comprising a proximal and a distal end that are perpendicular relative to one another. Furthermore, in some embodiments, a cuff can be attached to the proximal end of the brace, which allows the person to fasten their wrist with the cuff and thus secure themselves while holding the handle. In some embodiments, the cuff is made of soft material and is adjustable to accommodate and secure different wrist sizes.

In some embodiments, the assistive device's brace and adjustable plate that are coupled through the pivot point, can include coupling the distal end of the brace with the first and second grabbing members through the adjustable plate, which allows for rotation of the brace. Indeed, in some embodiments, the rotation of the brace causes the proximal end of the brace to move in a downward direction towards the first grabbing member and the distal end of the brace to move in an upward direction towards the second grabbing member. Further, in some embodiments, the brace is capable of coupling to the adjustable plate at a different pivot point relative to the adjustable plate, to allow for a different range of rotation of the brace.

In some embodiments, rotation of the brace around the pivot point and engagement in a second position of the second grabbing member is accomplished when an amount of weight applied on the brace exceeds one or more thresholds associated with the releasable clamp. In addition, in some embodiments, wherein the one or more thresholds associated with the releasable clamp determine the rotational speed of the brace.

Furthermore, in some embodiments of the instant application, a method for arresting the fall of a person using a guardrail, the method comprising the steps of providing a first grabbing member forming a handle, providing a second grabbing member that engages with the guardrail, providing an adjustable plate coupled to the first and second grabbing members, and providing a brace coupled to the adjustable plate and configured to rotate around a pivot point such that the brace and the second grabbing member are capable of forming a releasable clamp for engaging with the guardrail. Further actuating the second grabbing member through the rotation of the brace around the pivot point to selectively engage with the guardrail in either: a first position in which the releasable clamp is released from the guardrail to permit a sliding motion of the second grabbing member along the guardrail, or a second position in which the releasable clamp is clamped onto the guardrail such that movement of the second grabbing member along the guardrail is arrested, and disengaging the releasable clamp when the second grabbing member is placed from the second position back to the first position through the rotation of the brace in an opposite direction.

DETAILED DESCRIPTION

Figure 1A:
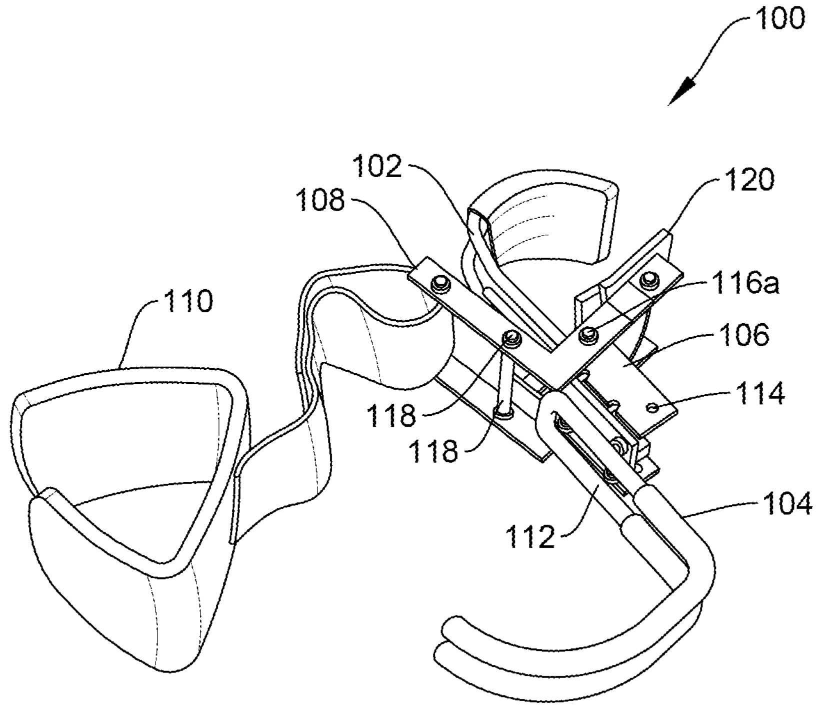
FIG. 1*a* is a right-attached, side view of the assistive device in accordance with some embodiments of the instant application.
Figure 1B:
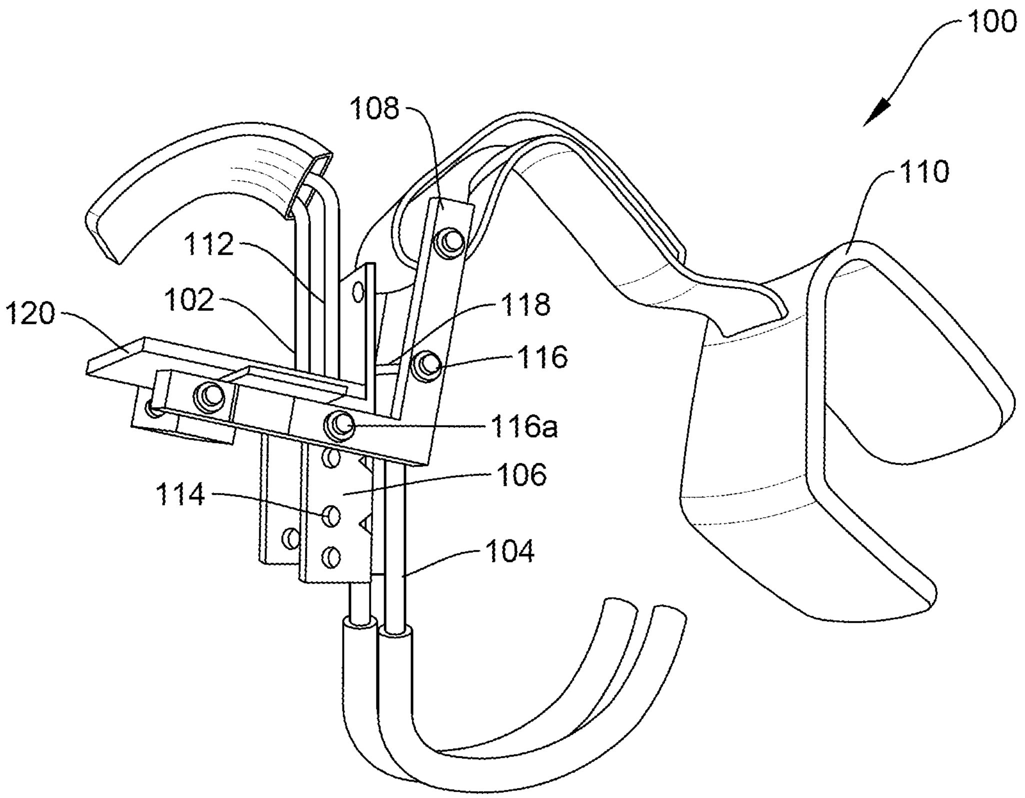
FIG. 1*b* is a left-attached, side view of the assistive device in accordance with some embodiments of the instant application.

Referring to FIGS. 1*a-b*, the assistive device 100 of the instant application comprises a number of main parts. In some embodiments, these include hook members 102, 104, adjustable plate 106, brace 108 and cuff 110. As will be shown later, the assistive device 100 can be connected onto a guardrail, banister, or other structural element that spans along the side of an uneven surface, including but not limited to a staircase, through for example, hook member 102.

In some embodiments hook members 102, 104 comprise metallic, steel or any other suitable material capable of withholding a desired weight. In addition, in some embodiments, hook members 102, 104, include a single, double or any suitable number of J hooks or utility hook that can be used for both grabbing and/or hooking materials. In some embodiments, hook members 102, 104 can include soft material at their respective curved sections in order to facilitate a smooth texture when grabbing and/or sliding onto the guardrail. Hook members 102 and 104 are connected through adjustable plate 106. For example, adjustable plate 106 can be a metallic-type plate made of steel or other appropriate materials that are capable of withstanding forces associated with the weight of a person. Adjustable plate 106 can have an orthogonal, parallelogram, or other suitable shape that allows for the placement of hook members 102, 104. Moreover, adjustable plate 106 can include various holes 112, threaded or not, in regular intervals along its length on the top (or bottom) side, which would allow for the use of screws, nut bolts, or any other suitable fastening materials in order to fasten multiple components together. In some embodiments, adjustable plate 106 can include additional holes 114 also placed in regular intervals, but running along the side of plate 106. For example, holes 112 can be used to fasten the plate together with hook members 102 and 104, thus coupling the two hook members together, while holes 114 can be utilized to couple brace element 108.

In addition, in some embodiments, hook member 102 can be fastened onto the adjustable plate 106 with the hook, curved area of the member facing down so as to form a concave surface that is capable of being attached in a structural element such as the guardrail of a staircase. In some embodiments, the size and diameter of the guardrail, banister, or other structural element to which hook member 102 is coupled can dictate the hole 112 of adjustable brace 106 to which it is fastened. For example, a large diameter or width guardrail would likely require fastening to the hole 112 closer to the top of the curved surface, while a smaller guardrail in diameter or width would likely dictate that the hook member 102 should be fastened at one of the holes 112 closer to the bottom of the adjustable plate 106 and hook member 102.

Conversely, hook member 104 is fastened onto the adjustable plate in a manner that is facing opposite and antisymmetrical to hook member 102. That is because, in some embodiments, hook member 104 is placed in a manner that forms a grabbing handle by having hook member 104 facing upwards to form a convex surface that avails it to grabbing by a person in need of mobility assistance when, for example, climbing up and down a staircase. Specifically, in some embodiments, hook member 104 is fastened to one or more holes 112 of adjustable brace 106. The choice of holes 112 to which hook member 104 is fastened can be decided based on several factors, including but not limited to the height of the person engaging with assistive device 100, the height of the guardrail, banister or similar structural element to which assistive device's hook member 102 engages, and of course the desired size of the assistive device, which can also influence its functionality in terms of being a permanent placement onto the guardrail or a portable device that the person can carry around and use as and when desired. In some embodiments, hook member 104 can include any suitable component that allows for additional secured placement of the person's hand and provides stability during movement.

Further, in some embodiments, brace 108 can be a single corner brace with a proximal and distal end that are perpendicular to one another. Corner brace 108 can also include fastening holes 116 used with accompanying screws to couple the brace with the adjustable plate 106. In some embodiments, brace 108 is fastened to adjustable plate 106 at single pivot point 116*a* and in a manner that allows rotation of the brace around pivot point 116*a*. Specifically, in reference to FIG. 1*a*, when brace 108 rotates anti-clockwise around pivot point 116*a* then the proximal end of corner brace moves in an upward direction towards hook member 102. On the other hand, the distal end of brace 108 moves in a downward position towards hook member 104. In some embodiments, brace 108 can be coupled to adjustable plate 106 at different locations. In such cases, pivot point 116*a* can be fastened at different locations. Specifically, these locations can be either vertically, representing a different hole 112 of the adjustable plate, or horizontally, representing a different hole 115 of the brace 108. In some embodiments, such adjustment can provide a different range of rotation for the brace which can impact the sensitivity of assistive device 100. For example, shifting the location of the pivot point closer to hook member 102 can cause brace 108 to rotate in a smaller angular range than having pivot point 116*a* closer to hook member 104.

In some embodiments, brace 108 comprises a brace kit that includes two corner braces 108 fastened together using additional horizontal members 118 coupled to holes 116. This coupling can allow for a corner brace that covers more area structurally and supports the area of hook members 102, 104. Indeed, in some embodiments, hook members 102, 104 each include a double J hook which provides a wider functional area and can be supported by the brace kit using two corner braces 108. Moreover, corner braces 108 are coupled to adjustable plate 106 in a manner whereby each corner brace is fastened through pivot point 116*a* for each of the corner braces 108 onto one of holes 112 of the adjustable plate placed on each of the plate's sides. As a result, the brace kit is capable of rotating as a single piece around pivot points 116*a*.

In some embodiments, brace kit can also include an additional member 120 that is disposed and fastened directly onto the proximal end of brace 108 to create a uniform shelf that moves and rotates in accordance with the rotation of the brace kit. In some embodiments, additional member 120 can be of any suitable material that allows for safe and smooth movement.

In some embodiments, brace 108 also comprises cuff 110 that is attached to the distal end of the brace. In some embodiments when a brace kit is used with two brace members 108, then cuff 110 is coupled to horizontal member 118 used to connect the two braces together. In some embodiments, cuff 110 is adjustable and can be made of any suitable material such as plastic, elastane, rubber etc. Further, in some embodiments cuff 110 can include a hook and loop type material or any other suitable adhesive. Cuff 110 is configured to be placed around the individual's wrist when using assistive device 100 to ensure the safe functionality of the device. Indeed, cuff 110 is placed around the hand of the person that engages hook member 102 by grabbing it in order to move about uneven surfaces such as a set of stairs.

Continuing, the assistive device depicted in FIG. 1*b*, shares the same components as assistive device 100 depicted in connection with FIG. 1*a*. The only difference is the placement of the device such that it can accommodate guardrails or other structural elements that are located to the left. For example, FIG. 1*a* depicts, for example, the placement of assistive device 100 when one climbs down one side of a set of stairs and holds on to hook member 102 with their right hand, while FIG. 1*b* depicts the same device placed in a manner where the individual wants to climb up that same set of stairs, but on the other side and now holds onto hook member 102 with their left hand.

The use of assistive device 100 to aid a person with their mobility when walking on uneven surfaces can provide a safe and portable solution increasing independence of individuals at various ages. For example, in some embodiments, when assistive device 100 is used for climbing up and down stairs that include a guardrail then the device is placed onto the guardrail such that hook member 102 is hooked onto the guardrail. During its operation, assistive device 100 can be in either a first or second position wherein when the device is in the first position then the person can freely move while when in the second position the person's movement is arrested in order to protect from a potential fall and injury.

Figure 2A:
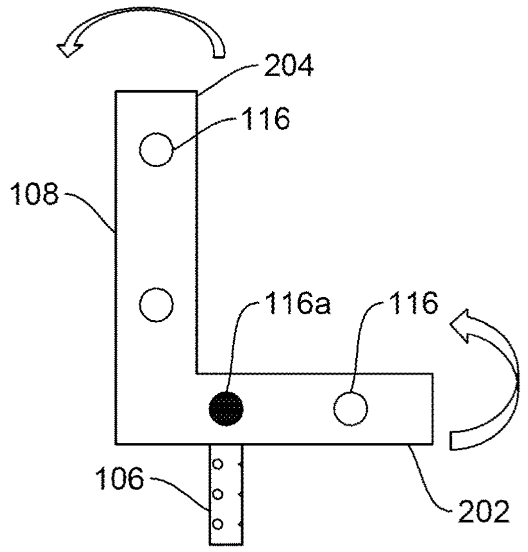
FIG. 2*a* is a diagram of the corner brace placed in a first position, in accordance with some embodiments of the instant application.
Figure 2B:
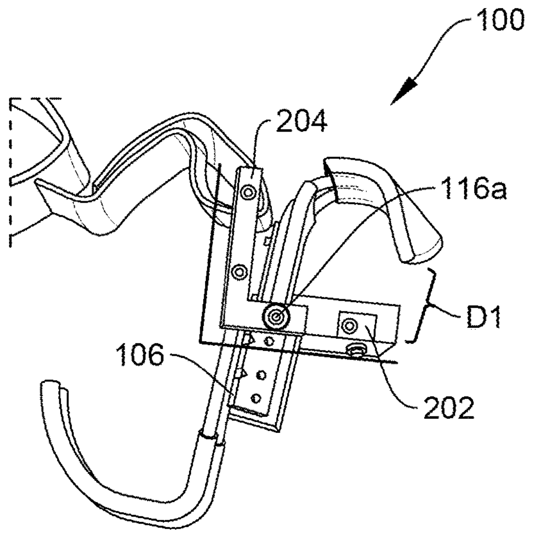
FIG. 2*b* is a side view of the assistive device placed in a first position, in accordance with some embodiments of the instant application.

FIGS. 2*a* and 2*b* depict components of assistive device 100 when it is placed in the first position of operation in accordance with some embodiments of the instant application. For example, FIG. 2*a* shows a side view of brace 108 or part of the brace kit that includes one of two braces 108. In some embodiments, brace 108 is a corner brace that also comprises multiple fastening holes 116. Brace 108 has a proximal end 202 and distal end 204. In some embodiments, proximal end 202 and distal end 204 are perpendicular. As discussed above, in connection with FIGS. 1*a*-1*b*, brace 108 also includes pivot point 116*a* which is one of existing holes 116 that adjustable plate 106 is fastened to, and permitted to rotate about, in an anti-clockwise direction. As shown in FIG. 2*a*, brace 108 is at a first position whereby the distal end 204 is substantially parallel relative to the axis extended by adjustable plate 106. Specifically, when placed at a first position, brace 108 is not rotated about pivot point 116*a*, rather it is at a resting state.

Indeed, as further shown in FIG. 2*b*, when in the first position, while brace 108 is at a resting state with no rotation around pivot point 116*a*, then assistive device 100 is capable of being coupled to a guardrail or any other stationary structural element along the set of stairs. As shown in more detail in FIG. 2*b*, when brace 108 is not rotated anti-clockwise towards hook member 104, then the distance D1 between the proximal end 204 of brace 108 and the concave end of hook member 104 is such that allows for the placement of assistive device 100 onto the guardrail without hindering its movement along it.

In some embodiments, to ensure that distance D1 is large enough to accommodate different sizes of guardrails, banisters etc., then brace 108 is capable of pivoting in a clockwise manner around pivot point 116*a*. As a result, the proximal end 202 of brace 108 moves downwards and the distance D1 becomes larger to allow for hook member 102 and proximal end 202 to hook onto the guardrail while also allowing for the free movement of assistive device 100. Moreover, in some embodiments, adjusting assistive device 100 to accommodate different sizes and types of structural elements that the device is coupled on can be accomplished by coupling the brace 108 and adjustable plate 106 at different fastening holes 116 and 112 respectively. Indeed, holes 112 and 116 are located in perpendicular planes and provide at least two degrees of freedom to assistive device 100.

Figure 3A:
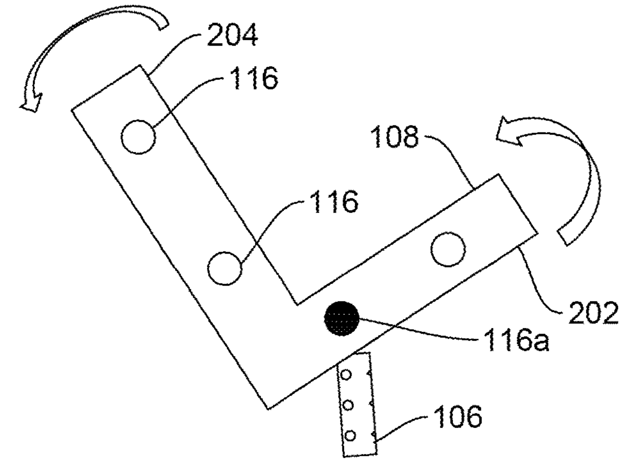
FIG. 3*a* is a diagram of the corner brace placed in a second position, in accordance with some embodiments of the instant application.
Figure 3B:
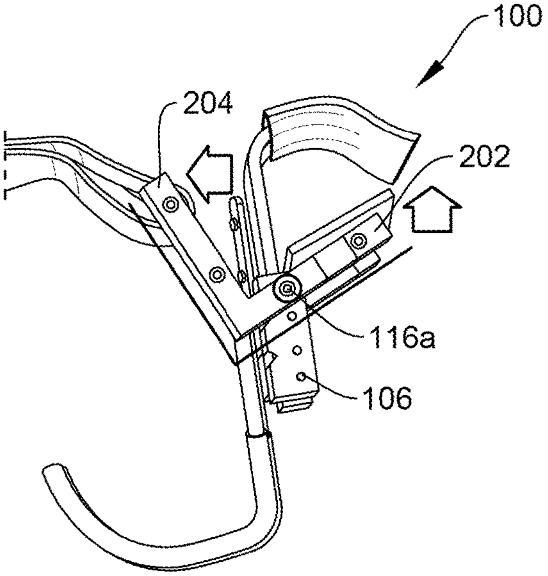
FIG. 3*b* is a side view of the assistive device placed in a second position, in accordance with some embodiments of the instant application.

FIGS. 3*a* and 3*b* depict components of assistive device 100 when it is placed in the second position of operation in accordance with some embodiments of the instant application. For example, FIG. 3*a* shows a side view of brace 108 or part of the brace kit that includes one of two braces 108. In some embodiments, brace 108 is a corner brace that also comprises multiple fastening holes 116. Similar to FIG. 2*a*, brace 108 has a proximal end 202 and distal end 204, wherein proximal end 202 and distal end 204 are perpendicular. Further, as also discussed above, brace 108 includes pivot point 116*a* which is one of existing holes 116 that adjustable plate 106 is fastened to, and permitted to rotate about, in an anti-clockwise direction. As shown in FIG. 3*a*, brace 108 is at a second position whereby the distal end 204 is rotated counterclockwise about pivot point 116*a*, which is relative to the axis extended by adjustable plate 106. Specifically, when placed at a second position, brace 108 is capable of being rotated about pivot point 116*a*. In some embodiments, brace 108 is capable of being rotated anywhere from 0 degrees to 90° degrees depending on factors including, different components of assistive device 100 such as material and type of brace 106 and/or design and material of hook member 102.

Continuing, as further shown in FIG. 3*b*, when in the second position, as brace 108 is rotated around pivot point 116*a*, the assistive device 100 is capable of forming a releasable clamp to a guardrail or any other stationary structural element along the set of stairs. Specifically, as shown in more detail in FIG. 3*b*, in some embodiments, when brace 108 is rotated, anti-clockwise, around pivot point 116*a* and towards hook member 104, then the distance D1 between the proximal end 202 of brace 108 and the concave end of hook member 104 decreases as the rotation progresses. Moreover, as the distance decreases, assistive device 100 clamps onto the guardrail hindering the possibility of its movement along it.

Once assistive device 100 is in the second position of operation and has formed a releasable clamp onto the guardrail, then in order for assistive device 100 to be used by the person for movement assistance, it has to be placed back into the first position as provided in FIGS. 2*a*-2*b*. In some embodiments, brace 108 can be manually placed back into the first position by rotating distal end 204 clockwise and placing it into its resting state. In some embodiments, brace 108 can return back to the first position in a self-activating manner through a biasing mechanism, such as a spring, that is engaged when certain conditions occur including the release of weight from brace 108.

Figure 4:
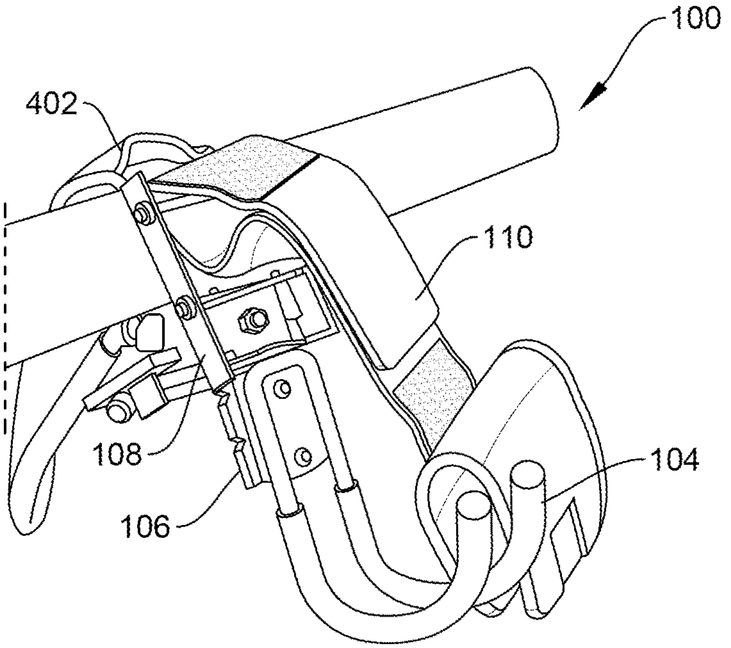
FIG. 4 is a view of the assistive device attached to a staircase guardrail and placed in the first position, in accordance with some embodiments of the instant application.

FIGS. 4-7 provide illustrations of the progression of operation during the exemplary use of assistive device 100 for climbing down a staircase. For example, FIG. 4 illustrates assistive device 100 placed onto the guardrail at a first position, as described in connection with FIGS. 2*a*-2*b*, prior to the placement of the device onto the person requiring the mobility assistance. Specifically, in some embodiments, brace 108 is at a resting state while hook member 102 is set onto the guardrail such that the concave part of hook member 102 rests on the top surface of the guardrail and is able to move in a sliding fashion up or down the guardrail. In some embodiments, hook member 102 is a J double hook whereby the concave double hook is placed in felt material or any other suitable soft material 402 to protect the guardrail and also enhance the sliding motion of assistive device 100.

Figure 5:
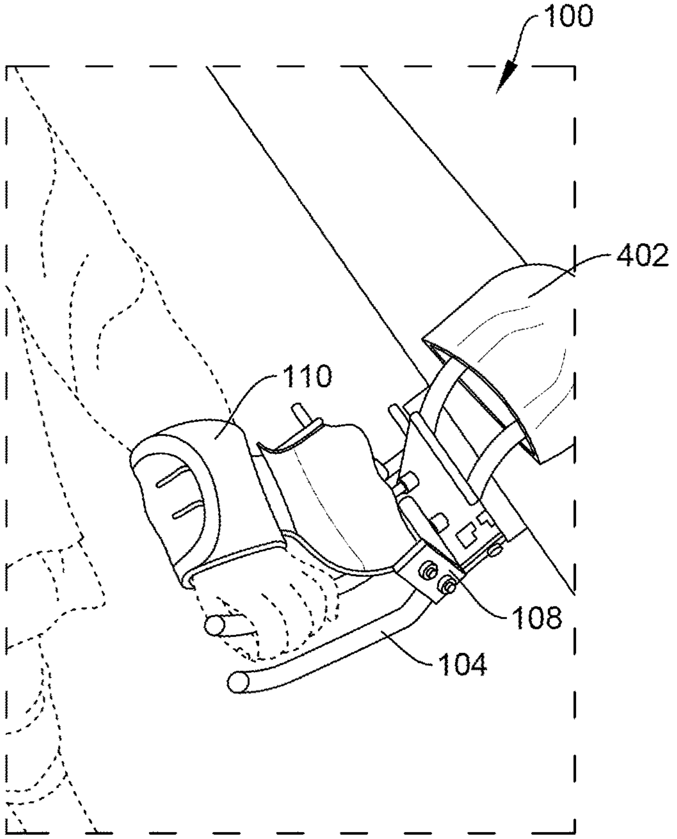
FIG. 5 is a view of the assistive device attached to a staircase guardrail and in use by a person, in accordance with some embodiments of the instant application.
Figure 6:
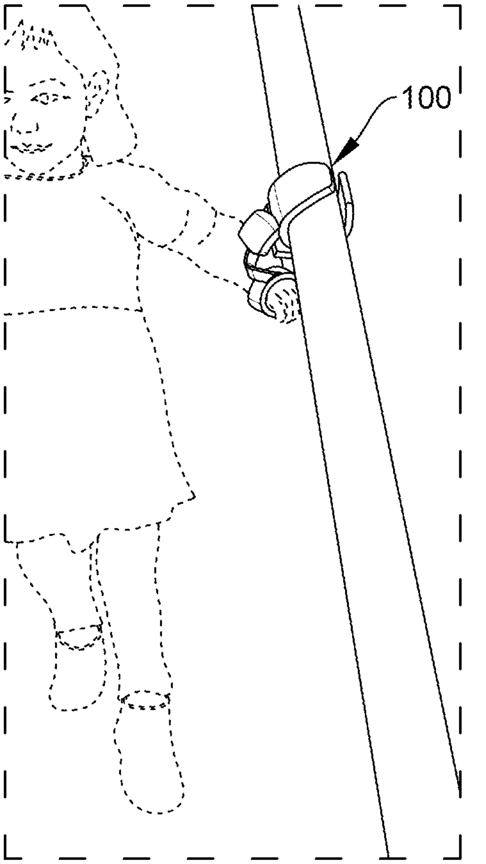
FIG. 6 is a view of the assistive device attached to a staircase guardrail and in use by a person during a fall that is in process, in accordance with some embodiments of the instant application.

Once assistive device 100 has been placed onto the guardrail, then, as illustrated in FIG. 5, the person grabs the hook member 104 and secures the device by placing and adjusting the cuff 110 onto their wrist. As discussed above in connection with FIG. 4, device 100 is at a first position and capable of sliding up and down the guardrail freely. Accordingly, as the person proceeds to, for example, climb down the stairs holding onto hook member 104, device 100 slides in parallel and at the same rate as the person's movement. As shown in FIG. 6, while the person is moving, a misstep may cause tripping or loss of balance and as a result the person may let go of hook member 104 while placing their weight onto cuff 110. In some embodiments, when that occurs, cuff 110 remains attached to brace 108 during the person's fall. As the weight is applied onto the distal end of brace 108 then the whole brace rotates anti-clockwise around pivot point 116*a* such that the distal end of brace 108 moves downwards towards hook member 104, and the proximal end of brace 108 moves upwards towards hook member 102 moving between the first and second positions as discussed in connection with FIGS. 2*a*-3*b*.

As brace 108 rotates anti-clockwise and distance D between hook member 102 and the proximal end of the brace 108 becomes smaller, assistive device is still capable of sliding in the direction that the person is moving. However, as the proximal end of brace 108 gets closer to and starts to abut the guardrail, then the ability of assistive device 100 to slide along the direction of movement becomes hindered. Notably, without assistive device 100, the person, having lost their balance while climbing down a set of stairs, would likely fall forward and potentially cause serious injury to themselves.

Figure 7:
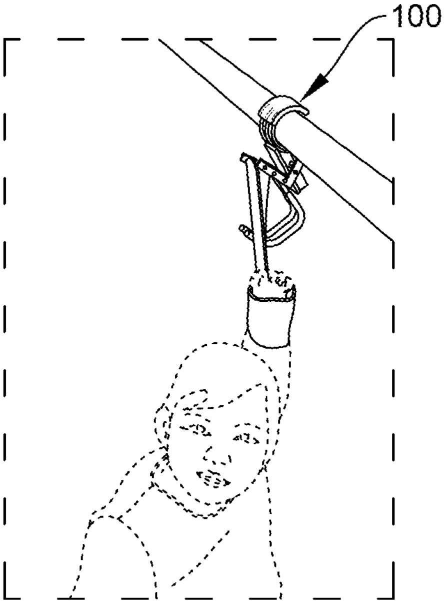
FIG. 7 is a view of the assistive device attached to a staircase guardrail and placed in the second position, in accordance with some embodiments of the instant application.

Once the proximal end of brace 108 has fully abutted the guardrail and assistive device has been placed in the second position, as shown in FIG. 7, then the device 100 forms a releasable clamp onto the guardrail and any sliding movement toward the direction of movement of the person is no longer possible. Specifically, in some embodiments, the person's weight is applied on the cuff 110 that causes rotation of brace 108 and the forming of the clamp onto the guardrail. As a result, the person's forward movement is arrested, and a potentially life-threatening injury can be avoided since assistive device 100 will seize any sliding movement and will remain firmly placed onto the guardrail until it is returned in the first position by rotating brace 108 in a clockwise manner. Although the person may still experience a jarring and/or pulling sensation around their arm, assistive device 100 provides protection from potentially severe injuries like concussions, broken bones, and other fall-related injuries.

Figure 8:
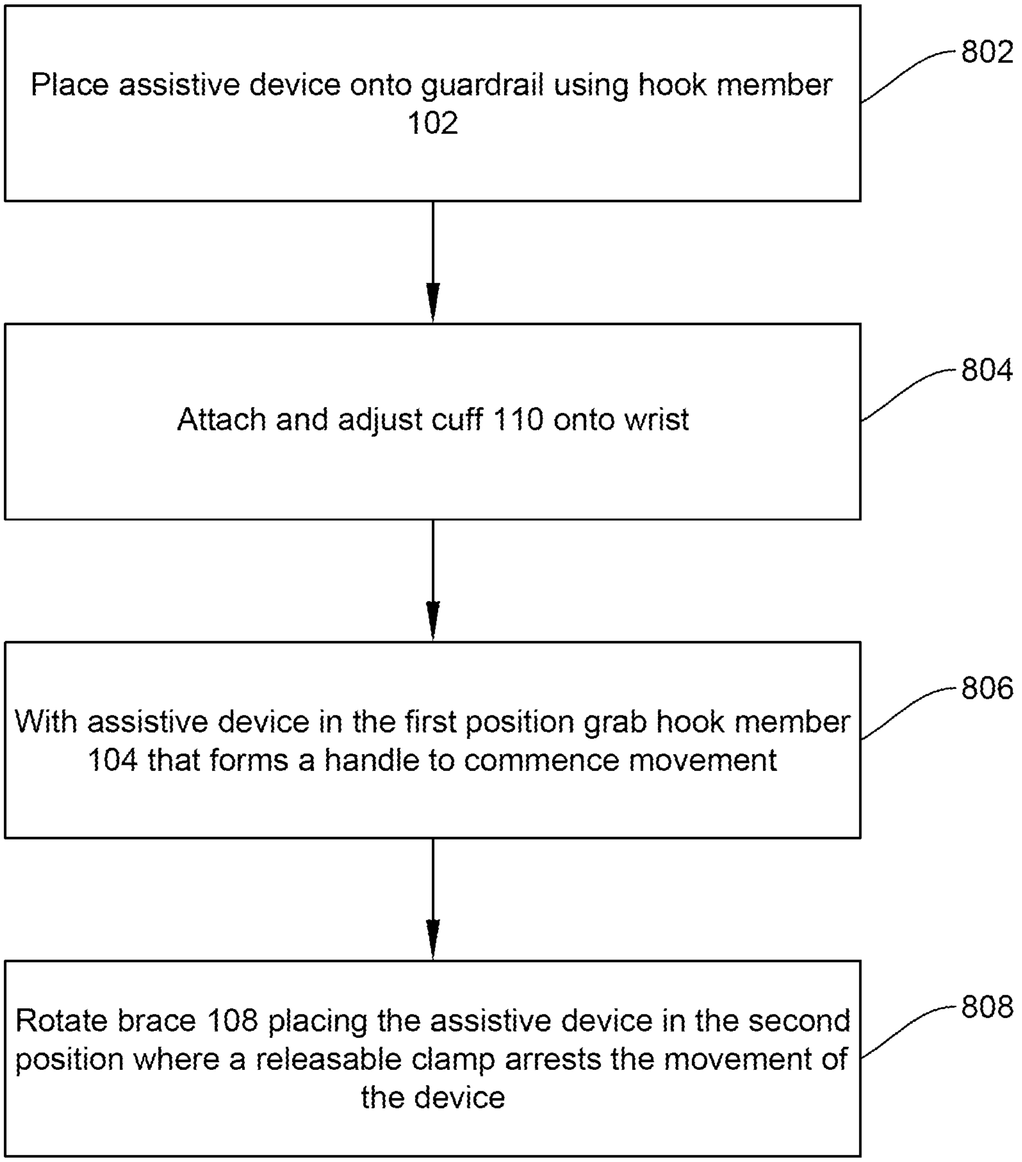
FIG. 8 is a flowchart of a method for aiding a person using the assistive device attached to a staircase guardrail, in accordance with some embodiments of the instant application.

FIG. 8 illustrates a flowchart depicting a method using assistive device 100 for aiding persons with mobility restriction to walk on uneven surfaces such as stairs. Specifically, at 802 a person places one or more assistive device 100 onto a guardrail, banister, or any other fixed structure along one or both sides of the staircase. In some embodiments, assistive device is placed in a first resting position, having hook member 102 placed onto the guardrail so that it is capable of moving in a sliding fashion in either direction.

At 804, cuff 110 is placed on the person's wrist and adjusted accordingly to ensure a tight and secure fit. In some embodiments, cuff 110 can include adhesive material or any other suitable fastening mechanism including, zipper, buttons etc. that allows for the secure placement of the cuff. At 806, the person grabs onto hook member 104 and climbs down or up the staircase based on their preferred direction. Assistive device 100 is capable of sliding along the guardrail as the person moves with the attached device onto the guardrail. In some embodiments, if the person trips and commences to fall then the person's weight will be applied onto cuff 110, which in turn will cause the brace 108 to rotate around pivot point 112*a* and move assistive device 100 from the first to the second position as discussed above in connection with FIGS. 3*a*-3*b*. Lastly, at 808, once assistive device 100 has entered the second position then brace 108 has rotated anti-clockwise and the proximal end of brace 108 abuts the guardrail. As shown in connection with FIGS. 3*a*-3*b*, when that occurs then assistive device 100 is no longer capable of sliding up or down the guardrail and the movement stops. As a result, the person's falling movement is arrested because the cuff 110 remains attached to their writs and potentially life-threatening injuries are averted.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An assistive device for arresting the fall of a person using a guardrail, the assistive device comprising:

a first grabbing member comprising at least one hook forming a handle capable of being held by the person using the assistive device while moving adjacent to the guardrail;

a second grabbing member comprising at least one hook capable of engaging with the guardrail by resting on a top surface of the guardrail;

an adjustable plate coupled to the first and second grabbing members; and a brace coupled to the adjustable plate at a pivot point and configured to rotate around the pivot point such that the brace and the second grabbing member are capable of forming a releasable clamp surrounding the guardrail, wherein the rotation of the brace around the pivot point causes the second grabbing member to selectively engage with the guardrail in either:

a first position in which a distance between the brace and the second grabbing member is sufficiently large such that the releasable clamp is released from the guardrail to permit a sliding motion of the second grabbing member along the guardrail, or a second position in which the distance between the brace and the second grabbing member is shortened such that the releasable clamp is clamped onto the guardrail such that movement of the second grabbing member along the guardrail is arrested.

2. The assistive device of claim 1, wherein the first and second grabbing members each comprise identical hook members.

3. The assistive device of claim 2, wherein the first and second grabbing members each include a double J hook.

4. The assistive device of claim 1, wherein the adjustable plate is adjustable in a vertical direction to accommodate for different guardrail sizes.

5. The assistive device of claim 1, comprising a soft material partially covering a surface of the second grabbing member, wherein the surface, when the second grabbing member is engaged with the guardrail, faces the guardrail.

6. The assistive device of claim 5, wherein the soft material is felt.

7. The assistive device of claim 1, wherein the first and second grabbing members are arranged in anti-symmetric and opposite directions.

8. The assistive device of claim 1, wherein the brace is a corner brace comprising a proximal end and a distal end that are perpendicular relative to one another.

9. The assistive device of claim 8, wherein a wrist cuff is attached to the distal end of the brace.

10. The assistive device of claim 9, wherein the wrist cuff is an adjustable strap to accommodate different wrist sizes.

11. The assistive device of claim 1, wherein the brace is capable of coupling to the adjustable plate at a different pivot point relative to the adjustable plate, to allow for a different range of rotation of the brace.

12. The assistive device of claim 9, wherein rotation of the brace around the pivot point causes the distal end of the brace to move in a downward direction towards the first grabbing member and the proximal end of the brace to move in an upward direction towards the second grabbing member.

13. The assistive device of claim 1, wherein the second position of the second grabbing member is engaged when an amount of weight applied on the brace exceeds one or more thresholds associated with the releasable clamp.

14. The assistive device of claim 13, wherein the one or more thresholds associated with the releasable clamp determine the rotational speed of the brace.

* * * * *